Figure 1:
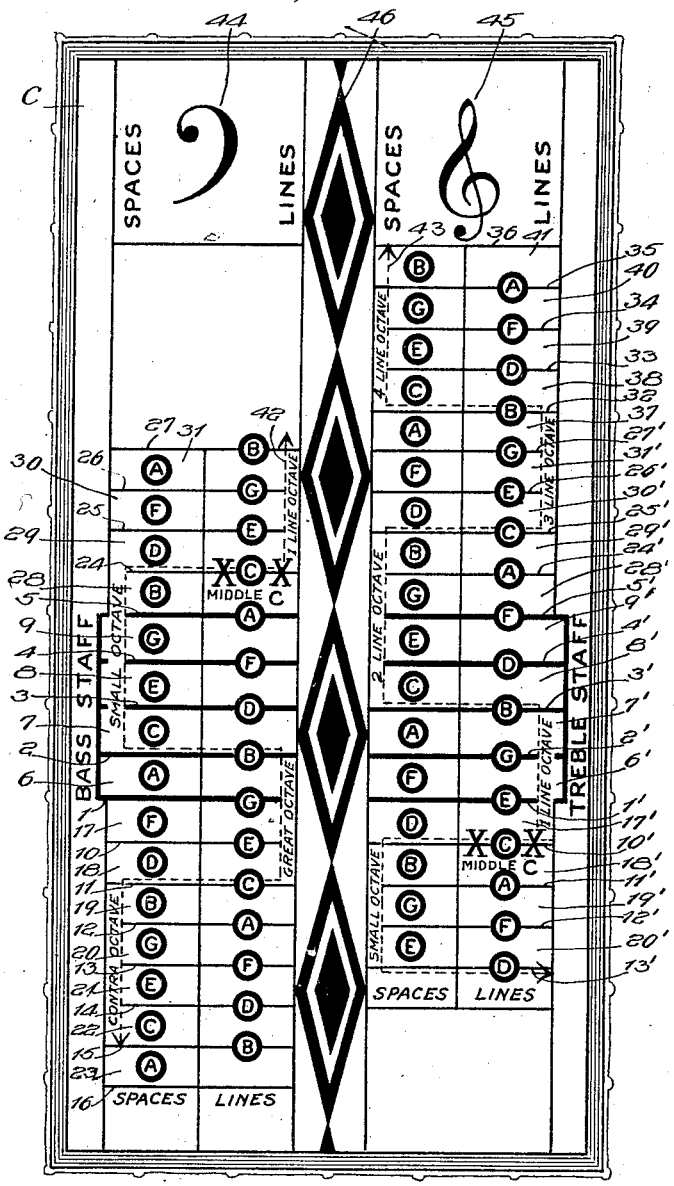

July 16, 1929.  W. ROSENBERG  1,721,282

ELEMENTARY MUSIC NOTE GUIDE

Filed Oct. 24, 1927

Inventor.
Wolf Rosenberg
By Hill & Hill
Attys

Patented July 16, 1929.

1,721,282

UNITED STATES PATENT OFFICE.

WOLF ROSENBERG, OF CHICAGO, ILLINOIS.

ELEMENTARY MUSIC-NOTE GUIDE.

Application filed October 24, 1927. Serial No. 228,344.

This invention pertains to the general class of devices designed for the purpose of the teaching and studying of music, and particularly to a note guide therefor.

It is well known that the beginner in music is confronted with the difficulty of forming a mental concept of written music. The staffs, particularly when arranged to form the great staff, together with the notes thereon and the letters assigned to the notes, present to the novice what appears to be insurmountable barrier. This often results in discouragement and a sudden curtailment of what otherwise might be a successful musical career. Even in those cases where the student appears to in a measure grasp the significance of a part of the written music, the length of time consumed, the amount of study necessary and the attendant monotony often result in more or less sluggishness and aimlessness. This is particularly true with children, especially younger pupils. Before taking up the study of music, the novice, except in very exceptional cases, has become familiar with the alphabet. Each letter in the alphabet has a certain significance to him and it carries that significance regardless of where it appears. There are twenty-six such letters, the first letter is $a$ and the last letter $z$. In the musical alphabet or scale, however, the letters appended to the notes are only seven in number and do not have the same significance except when appearing in the same relationship or position with respect to the great staff. The same letter appears several times in the great staff. Furthermore, the first letter of the musical scale or alphabet begins with $c$, runs to $g$, then begins with $a$ and returns to $c$. This is very confusing to the beginner. The great staff is made up of two staffs, one above the other, with a space between. The lower staff is known as the bass staff and the upper staff as the treble staff. Each staff, of course, as is well known, is made up of five lines numbered upward from the bottom, each staff forming four spaces between said lines. Another source of confusion is the relationship of the notes and letters representing said notes with respect to the treble staff and the bass staff. For instance, the note on the first line of the bass clef is $g$, whereas the note on the first line of the treble clef is $e$. Unless the student starts with a clear conception of the relationship of the musical scale with respect to each clef and is able to compare the relationship of the notes of one clef with those of the other, confusion is bound to occur. For this reason many authorities recommend introducing new notes to the pupil one at a time. However, with applicant's invention this difficulty is overcome. In the great staff middle $c$ occurs in the space between the two staffs. Very often music written in the treble runs lower than middle $c$ and music written in the bass clef runs higher than middle $c$. The possible confusion attendant therewith is obviated by the use of applicant's novel note guide.

An object of applicant's invention, therefore, is the production of a novel musical guide whereby the teaching and studying of written music is greatly facilitated. A further object of applicant's invention is the production of a musical guide wherein each staff together with its leger lines and added spaces both above and below are novelly arranged along side of another staff together with its leger lines and added spaces both above and below in order to show the relationship of one to the other and facilitate the teaching and studying of music.

A further object of applicant's invention is the production of a note guide wherein the notes of each clef are arranged such that the notes falling in spaces are spaced laterally from the notes falling on lines.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a front elevation of the device.

Referring now to the drawing, on which a sheet or card C is represented, the bass staff is shown on the left of the single figure of the drawing, in which 1, 2, 3, 4 and 5 are appended to the lines of the staff numbered consecutively from the bottom up as is customary. Between lines 1, 2, 3, 4 and 5 are spaces 6, 7, 8 and 9. Below the bass staff are lines 10, 11, 12, 13, 14, 15 and 16, representing leger lines and at 17, 18, 19, 20, 21, 22 and 23 are shown areas representing added spaces. Above the bass staff lines 24, 25, 26 and 27 represent leger lines, and areas 28, 29, 30 and 31 represent added spaces.

On the right hand side of the single figure is shown the treble staff with its lines 1', 2', 3', 4' and 5' numbered consecutively from the bottom upward. Between the lines are spaces 6', 7', 8' and 9'. Below the treble staff are lines 10', 11', 12' and 13' representing leger lines, and areas 17', 18', 19' and 20' representing added spaces. Above the treble staff are shown lines 24', 25', 26' and 27', 32, 33, 34, 35 and 36 representing leger lines. Between the last-mentioned lines are areas 28', 29', 30', 31', 37, 38, 39, 40 and 41 representing added spaces.

The lines representing each staff are preferably heavier and thus distinguish from the lines representing the leger lines. It will be noted that the lines of the bass staff are arranged opposite the lines of the treble staff and preferably in a manner such that the corresponding lines of each staff appear to be one line broken at its center. Each of the lines and spaces is given its proper letter.

Middle c appears on line 24 on the left hand side of the figure and directly above the bass staff. Middle c also appears on the right hand side of the figure and on the first leger line below the treble staff, namely 10'. These are preferably emphasized by the letters x—x or the like, indicating the common line of the staffs. The relationship of middle c to the staffs is thus clearly set forth and becomes at once apparent to the student. The arrangement of the bass staff with its leger lines and added spaces both above and below and appearing as it does along side of the arrangement of the treble staff with its leger lines and added spaces both above and below, clearly sets forth to the pupil the relationship of the notes with respect to those two staffs and their relationship with respect to the great staff. This particular arrangement of staffs together with the appended leger lines and added spaces greatly simplifies the teaching of rudimentary music.

It is noted that g appears on the bass staff on the first line and in the fourth space. However, in the treble staff g appears on the second line and in the first added space above the staff. The relationship is thus clearly shown. Furthermore, the g note appearing on the second line of the treble staff, is one line higher than the g note appearing on the first line of the bass staff. This same relationship holds throughout the chart both with respect to opposite spaces and opposite lines, irrespective of whether those lines and spaces are a part of the staffs proper or are leger lines or added spaces.

The student can thus at a glance comprehend the relationship between the two clefs. Furthermore, in order to clearly show the particular octave to which a certain note belongs, each clef may have a dotted line such as lines 42 and 43 running rectangularly or otherwise therethrough and partially surrounding each octave in order to set it forth clearly. The octaves may also be labeled to identify the same. Other added musical symbols may be added to the guide such as symbols for the bass and treble clefs appearing at 44 and 45, respectively.

To clearly show which notes fall on lines and which notes fall in spaces applicant preferably spaces the former from the latter as shown in the single figure. In each clef, notes falling in spaces are shown arranged in linear relationship and spaced laterally from notes falling on lines, which are also shown arranged in linear relationship. This arrangement not only assists in distinguishing the notes of a particular clef from each other, but also assists in clarifying the relationship of the notes of each clef to those of the others.

The guide may be made up in any color or may be made up in contrasting colors showing the bass staff and treble staff in one color and the leger lines in another color, or the bass staff may be in one color, the treble staff in another color, and the leger lines appended to each staff, each in a different color. The effect of a contrast of colors is readily apparent. I have heretofore made the lines 1, 2, 3, 4, 5, 1', 2', 3', 4' and 5' together with the notes superimposed on the lines and in the spaces between in red, also the x—x characters and the words Bass staff, Treble staff and some of the ornamental features, the balance being in black so that a contrast is obtained making the chart more striking to the eye. A suitable ornament 46 to divide the two staffs with their appended leger lines may also be provided if desired. It is obvious that more leger lines may be added to the form shown, if desired. The leger lines are shown in such a way that same are not confusing to the pupil and may be readily learned.

This chart is very effective in the study of music, not only with respect to the piano or organ, but also in learning to play various other musical instruments, such as used in band and orchestra work. A great deal of band and orchestra music is written in one clef only for each instrument. This clef is, for most instruments, either bass or treble clef. However, other clefs are also employed for certain instruments, such as the alto clef, the tenor clef, or what is known as the C clef. A musician accustomed to playing an instrument with music written in the treble clef, for instance, experiences great difficulty when changing to an instrument for which music is written in the bass clef. For this reason, publishers of orchestra and band music, for instance, publish various parts such as trombone, baritone, etc., in both clefs, one being a duplicate of the other. The use of applicant's novel device is readily apparent in this situation, enabling the beginner or experienced player, as the case might be, to readily appreciate and grasp the relation of each staff to the other. Applicant's device is not limited to showing the relationship between the bass staff and treble staff only, but any other staffs may be added or any other combination of staffs may be provided.

The guides or charts for all other instruments will be of the same style and idea but, of course, arranged according to the number of notes and clefs in each particular instrument required. The charts may be ornamented with a frame or some other embellishment that will give the same a more graceful or attractive appearance, and the quality and character of paper and style of print may be varied, as well as the same made in varied sizes. The letters may be of more than one color to set them forth distinctly so as to be readily picked up by the eye.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a musical note guide of the kind described, means for showing the relative positions of notes of the various octaves with respect to the bass staff and the treble staff, comprising arranging the bass staff and treble staff opposite each other in a manner such that the lines of one staff are in longitudinal alignment with the lines of the other staff.

2. In a musical note guide of the kind described, means for setting forth the relationship of the positions of the notes of one clef with respect to the positions of the notes of another clef comprising arranging the staffs of said clefs side by side so that one staff is a substantial continuation of the other, adding lines representing leger lines above each of said staffs, and adding lines representing leger lines below each of said staffs.

3. In a musical note guide of the kind described, means for facilitating the study of music comprising arranging one clef alongside of another clef, the staffs of each clef represented by lines, and lines above and below said first-mentioned lines, said second-mentioned lines representing leger lines and contrasted with respect to said first-mentioned lines.

4. In an elementary musical note guide of the kind described, means for facilitating the study of music comprising arranging one clef alongside of another clef, the staffs of each clef represented by lines, characters on said lines and in the spaces between said lines, said characters corresponding to the respective notes which would be positioned on said lines and in said spaces, lines above and below said first-mentioned lines, said second-mentioned lines representing leger lines and having characters appended thereto representing the notes that would be positioned on said lines, and characters in the areas between said second-mentioned lines, said areas representing added spaces and said characters in said areas corresponding to the notes that would be positioned in said added spaces.

5. In an elementary musical note guide of the kind described, means for facilitating the study of music comprising arranging the bass staff and treble staff opposite each other so that the lines of one staff are in substantial alignment with the lines of the other staff, adding lines representing leger lines above the treble staff and adding lines representing leger lines below the bass staff.

6. A note guide of the kind described comprising a sheet provided with a series of spaced parallel lines representing a bass clef with spaced leger lines below and above the same, a second series of spaced parallel lines representing the treble clef with leger lines arranged below and above the same, said spaced parallel lines of the two clefs being arranged side by side so that the staff lines of one are substantially a continuation of the staff lines of the other, and characters for identifying the respective notes and indicating the lines and spaces with which said notes are identified.

7. A note guide of the kind described comprising a sheet provided with a series of spaced parallel lines representing a bass clef with spaced leger lines below and above the same, a second series of spaced parallel lines representing the treble clef with leger lines arranged below and above the same, said spaced parallel lines of the two clefs being arranged side by side so that the staff lines of one are substantially a continuation of the staff lines of the other, and characters for identifying the respective notes and indicating the lines and spaces with which said notes are identified, and means for identifying a note common to each clef.

8. In an elementary musical note guide of the kind described, means for facilitating the study of music comprising arranging a plurality of staffs of different clefs side by side so that the lines of one staff are in substantial alignment with the lines of each other staff.

9. In a note guide of the kind described, means for facilitating the study of music comprising arranging one clef alongside another clef, the staffs of each clef represented by lines, and lines arranged parallel to said first mentioned lines, said second mentioned lines representing leger lines.

10. In a note guide of the kind described, means for distinguishing space notes from line notes, said means comprising arranging said first mentioned notes in linear relationship, arranging said second mentioned notes in linear relationship, and spacing said first mentioned notes laterally from said second mentioned notes.

11. In an elementary musical note guide of the kind described, means for facilitating the study of music comprising arranging a plurality of staffs of different clefs, side by side, so that the lines of one staff are in substantial alignment with corresponding lines of each other staff, and spacing the line notes of each clef from their associated space notes.

In testimony whereof, I have hereunto signed my name.

WOLF ROSENBERG.